United States Patent
Matsunaga et al.

(10) Patent No.: US 11,002,342 B2
(45) Date of Patent: May 11, 2021

(54) CAMSHAFT DRIVE DEVICE

(71) Applicant: ISUZU MOTORS LIMITED, Tokyo (JP)

(72) Inventors: Tsutomu Matsunaga, Ayase (JP); Naoki Mizukami, Atsugi (JP); Kazuhiro Hirose, Yokohama (JP)

(73) Assignee: ISUZU MOTORS LIMITED, Tokyo (JP)

( * ) Notice: Subject to any disclaimer, the term of this patent is extended or adjusted under 35 U.S.C. 154(b) by 594 days.

(21) Appl. No.: 15/775,308

(22) PCT Filed: Nov. 11, 2016

(86) PCT No.: PCT/JP2016/083603
§ 371 (c)(1),
(2) Date: May 10, 2018

(87) PCT Pub. No.: WO2017/082422
PCT Pub. Date: May 18, 2017

(65) Prior Publication Data
US 2018/0335111 A1 Nov. 22, 2018

(30) Foreign Application Priority Data
Nov. 12, 2015 (JP) .............................. JP2015-222133

(51) Int. Cl.
*F16H 7/08* (2006.01)
*F02B 67/06* (2006.01)
(Continued)

(52) U.S. Cl.
CPC ............... *F16H 7/08* (2013.01); *F02B 67/06* (2013.01); *F16H 7/06* (2013.01); *F16H 7/18* (2013.01);
(Continued)

(58) Field of Classification Search
CPC ...... F16H 7/08; F16H 7/06; F16H 2007/0842; F16H 2007/0844; F16H 2007/0872;
(Continued)

(56) References Cited

U.S. PATENT DOCUMENTS 4,607,601 A * 8/1986 Kohler ................. F02F 7/0043
123/90.31
6,312,353 B1 * 11/2001 Oba ......................... F16H 7/18
474/111
(Continued)

FOREIGN PATENT DOCUMENTS

GB 2424936 A 10/2006
JP S60-066803 U1 5/1985
(Continued)

OTHER PUBLICATIONS

JP08-105499A Translation; Cam Chain Guide Device For Internal Combustion Engine; Katabira et al; Published: Apr. 23, 1996 (Year: 1996).*
(Continued)

*Primary Examiner* — Michael R Mansen
*Assistant Examiner* — Raveen J Dias
(74) *Attorney, Agent, or Firm* — Procopio, Cory, Hargreaves & Savitch LLP

(57) ABSTRACT

A cam shaft drive device includes a chain, a guide lever, a chain chamber, which is provided in a cylinder head, a support bolt, which pivotably supports the guide lever, the support bolt including a head portion, a male screw portion, and a shaft portion, which is inserted through the support hole of the guide lever, an insertion hole, which is through which the support bolt is inserted, and a female screw hole, which is provided in the rear wall and into which the male screw portion is screwed, wherein a length from a rear end to a front end of the shaft portion is longer than an axial (Continued)

distance from a front end of the support hole to a front end of the insertion hole in a state where the guide lever abuts on the rear wall.

4 Claims, 4 Drawing Sheets

(51) Int. Cl.
*F16H 7/18* (2006.01)
*F16H 7/06* (2006.01)
*F01L 1/02* (2006.01)
*F02F 7/00* (2006.01)
*F16H 57/035* (2012.01)

(52) U.S. Cl.
CPC ............ *F16H 57/035* (2013.01); *F01L 1/022* (2013.01); *F02F 2007/0075* (2013.01); *F16H 2007/0842* (2013.01); *F16H 2007/0872* (2013.01); *F16H 2007/0874* (2013.01); *F16H 2007/0893* (2013.01)

(58) Field of Classification Search
CPC .............. F16H 2007/0874; F16H 7/18; F16H 2007/0893; F02B 67/00; F02B 67/04; F02B 67/06; F01L 1/022; F01L 1/024; F01L 1/348; F02F 7/0073; F02F 2007/0075; F02F 2007/0078
USPC ........................................................ 474/110
See application file for complete search history.

(56) References Cited

U.S. PATENT DOCUMENTS

| | | | | |
|---|---|---|---|---|
| 6,322,471 B1* | 11/2001 | Hashimoto | ............... | F16H 7/18 474/101 |
| 6,428,435 B1* | 8/2002 | Kumakura | ............... | F16H 7/08 474/111 |
| 6,458,055 B1* | 10/2002 | Bellamy-Booth | .... | F16H 7/1281 474/117 |
| 2002/0128100 A1* | 9/2002 | Inoue | ........................ | F16H 7/18 474/111 |
| 2003/0127066 A1* | 7/2003 | Maier | .................... | F02F 7/0007 123/196 R |
| 2004/0182981 A1* | 9/2004 | Oba | ...................... | B23P 19/042 248/346.03 |
| 2006/0240923 A1* | 10/2006 | Yokoyama | ............... | F01L 1/024 474/111 |
| 2009/0036241 A1* | 2/2009 | Hirayama | .................. | F16H 7/18 474/111 |
| 2009/0111629 A1 | 4/2009 | Kobara et al. | | |
| 2012/0192821 A1* | 8/2012 | Herbert | ................... | F01L 1/022 123/90.31 |
| 2013/0210566 A1* | 8/2013 | Konno | ...................... | F16H 7/18 474/111 |
| 2015/0141185 A1* | 5/2015 | Albrecht | ................. | F16H 55/36 474/199 |
| 2017/0037956 A1* | 2/2017 | Mishima | .............. | F16H 57/0456 |
| 2017/0328243 A1* | 11/2017 | Mendler | ................. | F01L 1/024 |

FOREIGN PATENT DOCUMENTS

| | | | |
|---|---|---|---|
| JP | H06-185313 A | | 7/1994 |
| JP | H07-197802 A | | 8/1995 |
| JP | 08105499 A | * | 4/1996 |
| JP | 2009-108909 A | | 5/2009 |
| JP | 2012-031874 A | | 2/2012 |
| JP | 2015169329 A | | 9/2015 |
| WO | 97/33104 A1 | | 9/1997 |

OTHER PUBLICATIONS

International Search Report and Written Opinion for related PCT application No. PCT/JP2016/083603, dated Jan. 31, 2017; English translation of ISR provided; 8 pages.
Notice of Reasons for Refusal for related JP App No. 2015-222133 dated Aug. 2, 2019, 5 pgs.
Extended European Search Report for related European Application No. 16864383.1, dated Jun. 13, 2019; 6 pages.

* cited by examiner

CAMSHAFT DRIVE DEVICE

CROSS-REFERENCE TO RELATED APPLICATIONS

This application is a U.S. National Stage entry of PCT Application No: PCT/JP2016/083603 filed Nov. 11, 2016, which claims priority to Japanese Patent Application No. 2015-222133, filed Nov. 12, 2015, the contents of which are incorporated herein by reference.

TECHNICAL FIELD

This disclosure relates to a camshaft drive device of an internal combustion engine.

BACKGROUND ART

In order to drive a camshaft of an internal combustion engine with a crank shaft, a camshaft drive device of a chain drive type has been known. The camshaft drive device has a cam sprocket attached to the camshaft, a chain wound around the cam sprocket, and a guide lever as a chain guide to guide the chain.

CITATION LIST

Patent Literature

[Patent Literature 1]: Japanese Unexamined Patent Application Publication No. H6-185313

SUMMARY

Technical Problem

It is conceivable to form a cylindrical chain chamber which accommodates the chain and the guide lever, in a cylinder head. When an engine is assembled, it is conceivable that the chain in the chain chamber is pulled up and wound around the cam sprocket, the guide lever is inserted from above, and the guide lever is pivotably supported by causing a support bolt to be inserted through a support hole of the guide lever.

In this case, the support bolt is inserted from the front into an insertion hole of a front wall which defines the chain chamber and inserted through the support hole of the guide lever, and then the support bolt is tightened in a female screw hole of a rear wall which defines the chain chamber.

In this case, there is work of installing the support bolt through the small insertion hole, but when the support bolt is accidentally released, there is a possibility of dropping the support bolt into the chain chamber, and therefore there is difficulty in workability.

This disclosure provides a camshaft drive device in which installation work of a support bolt can be facilitated.

Solution to Problem

According to a first aspect of the disclosure, a camshaft drive device includes: a cam sprocket, which is attached to a camshaft; a chain, which is wound around the cam sprocket; a guide lever, which guides the chain and has a support hole; a chain chamber, which has a cylindrical shape and is provided in a cylinder head to accommodate the chain and the guide lever, the chain chamber being defined by a front wall and a rear wall facing each other in an axial direction; a support bolt, which pivotably supporting the guide lever, the support bolt including a head portion that is formed in a front end portion, a male screw portion that is formed in a rear end portion, and a shaft portion that is formed between the head portion and the male screw portion and is pivotably and slidably inserted through the support hole of the guide lever; an insertion hole, which is provided in the front wall and through which the support bolt is inserted from a front side; and a female screw hole, which is provided in the rear wall and into which the male screw portion of the support bolt is screwed, wherein a length from a rear end to a front end of the shaft portion is longer than an axial distance from a front end of the support hole to a front end of the insertion hole in a state where the guide lever abuts on the rear wall.

In the camshaft drive device described above, the length from the rear end to the front end of the shaft portion of the support bolt may be longer than the axial distance from the front end of the support hole to the rear end of the insertion hole in a state where the guide lever abuts on the rear wall.

In the camshaft drive device described above, the length from a rear end of the male screw portion to a front end of the head portion of the support bolt may be longer than the axial distance from a front end of the female screw portion to the front end of the insertion hole in a state where the guide lever abuts on the rear wall.

The guide lever of the camshaft drive device described above may have a knob portion which protrudes upward from the chain chamber at an upper end portion.

Advantageous Effects

According to the disclosure, installation work of a support bolt can be facilitated.

DESCRIPTION OF EMBODIMENTS

Hereinafter, an embodiment of the disclosure will be described with reference to the accompanying drawings.

Figure 1:
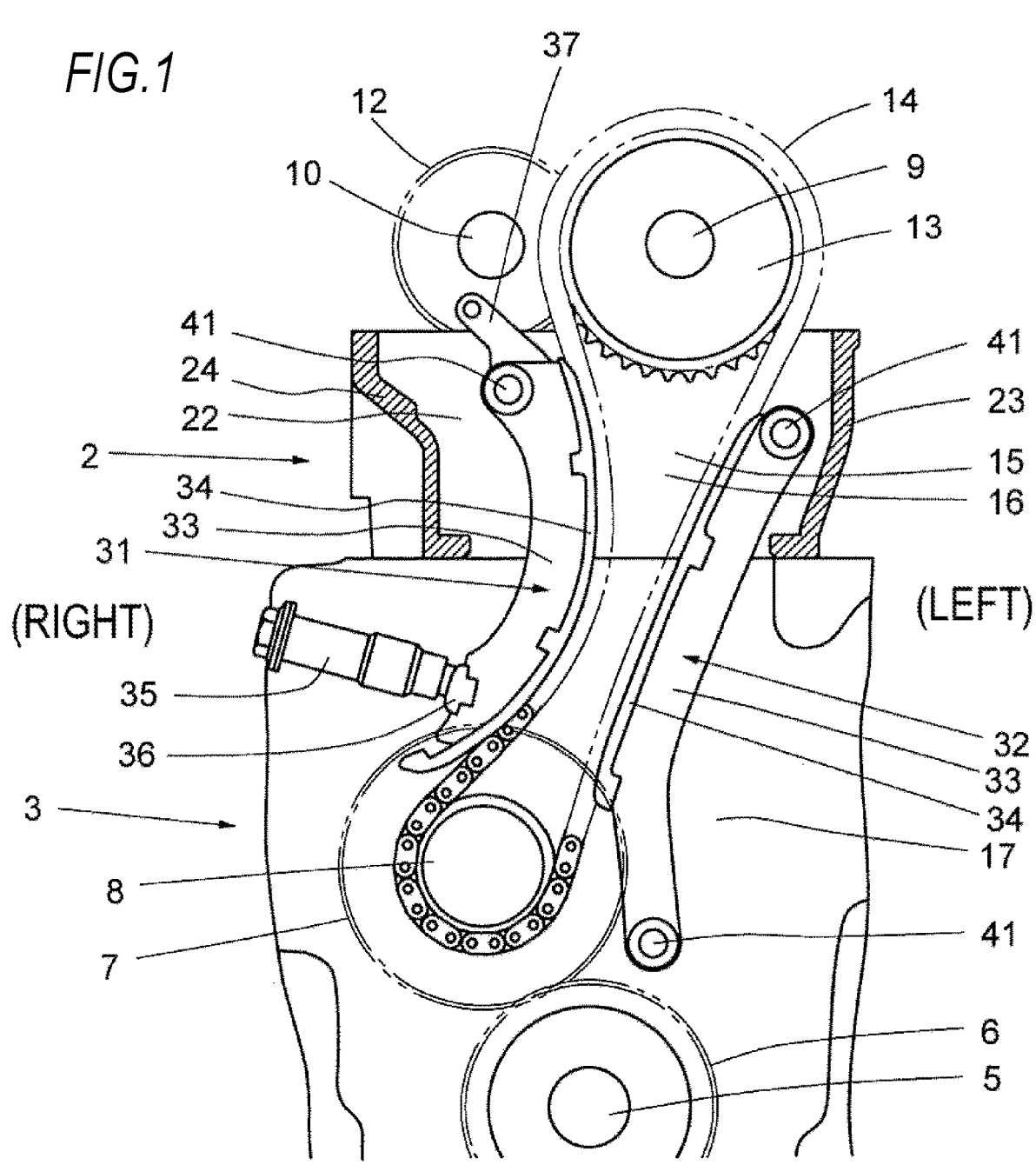
FIG. 1 is a front view illustrating an inner portion of a camshaft drive device.
Figure 2:
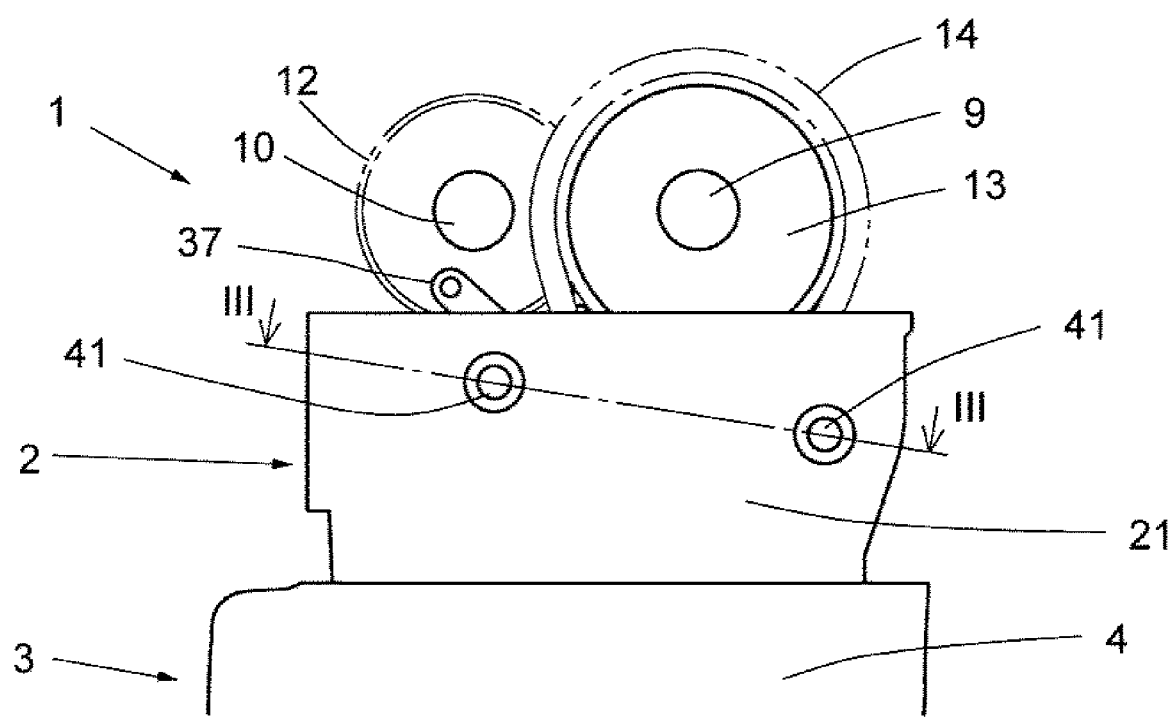
FIG. 2 is a front view illustrating an appearance of the camshaft drive device.

FIG. 1 is a front view illustrating an inner portion of a camshaft drive device according to the embodiment and is a view as seen from the front in an axial direction of a camshaft. FIG. 2 is a front view illustrating the appearance of the camshaft drive device. The front side in a thickness direction of a paper sheet of the drawing is set to a front side and the back side thereof is set to a back side.

An internal combustion engine (engine) according to the embodiment is a diesel engine mounted on a vehicle such as a truck. However, there are no particular limitations on the type, application, or the like, of the vehicle and the internal combustion engine.

As illustrated in FIG. 2, an engine 1 includes a cylinder head 2 and a cylinder block 3. A chain chamber cover 4 is detachably attached to the front end portion of the cylinder block 3 by a plurality of bolts (not illustrated). The front end portion of the cylinder head 2 is formed in a cylindrical shape (see FIG. 3) extending in the cylinder axis direction and having a substantially rectangular cross section and a chain chamber is defined therein.

FIG. 1 illustrates an inner portion of a chain chamber 15 by removing the chain chamber cover 4 and depicting the cylinder head front end portion in cross section. As illustrated in the drawing, a crank gear 6 attached to a crank shaft 5 meshes with an idle gear 7 journaled by the cylinder block 3. An idle sprocket 8 is coaxially fixed to the idle gear 7. On the other hand, camshafts 9 and 10 for intake and exhaust are rotatably attached to the cylinder head 2. Cam gears (only the camshaft 10 side is indicated by reference numeral 12) meshed with each other are attached to the camshafts 9 and 10. A cam sprocket 13 is also attached to one camshaft 9 and a chain 14 is wound around the cam sprocket 13 and the idle sprocket 8. As a result, the camshafts 9 and 10 are connected to the crank shaft 5 so as to be able to transmit power and can be rotationally driven by the crank shaft 5.

The chain chamber 15 includes an upper chain chamber 16 which is provided inside the cylinder head 2 and a lower chain chamber 17 which is defined by a cylinder block front wall and the chain chamber cover 4. The crank shaft 5, the crank gear 6, the idle gear 7, the idle sprocket 8, and the lower half of the chain 14 are accommodated in the lower chain chamber 17.

Figure 3:
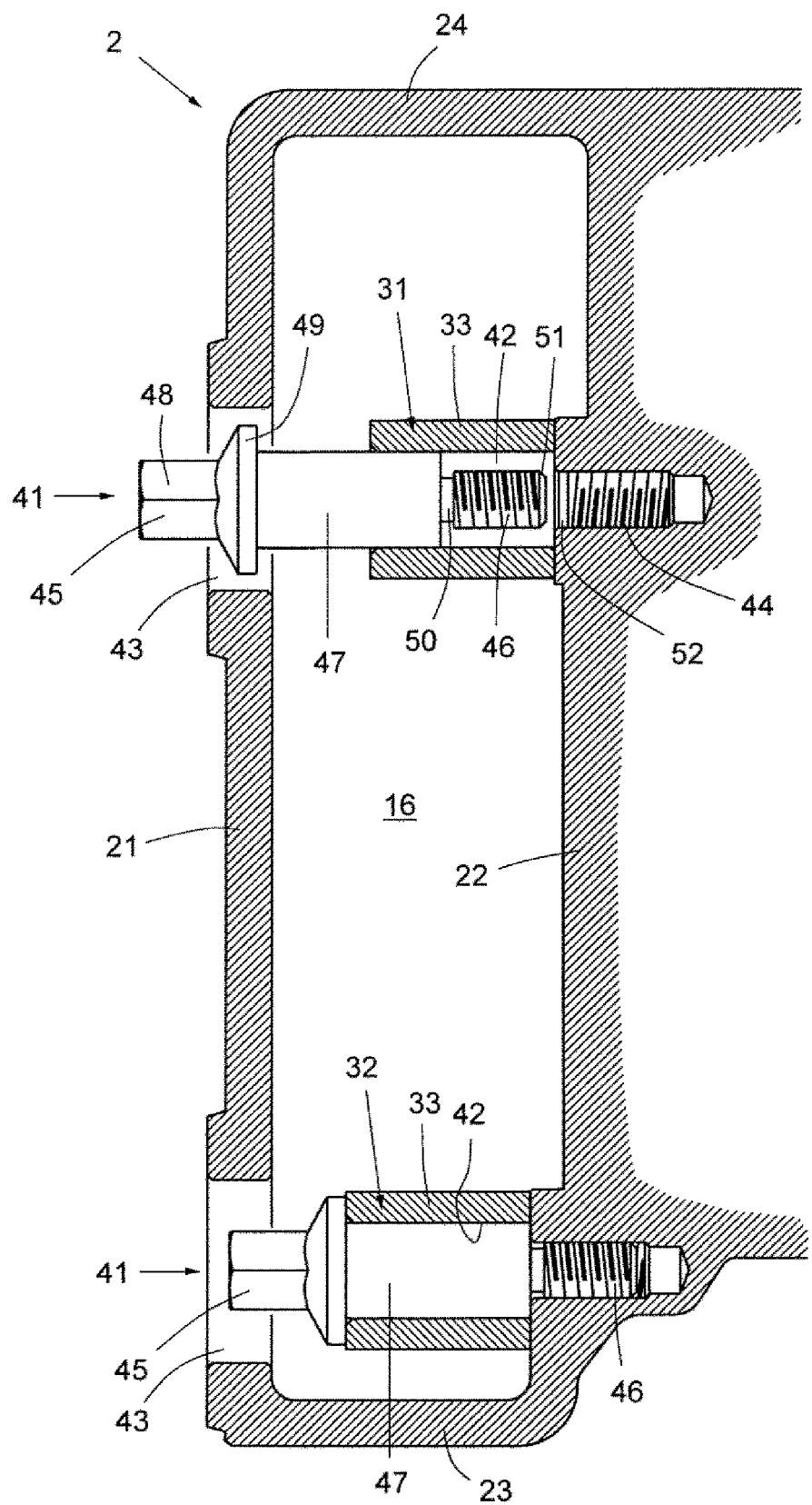
FIG. 3 is a cross-sectional view taken along a line in FIG. 2.

As illustrated in FIG. 3, the upper chain chamber 16 is defined by a front wall 21, a rear wall 22, and left and right side walls 23 and 24 which are formed integrally with the cylinder head 2. The upper chain chamber 16 is open at the upper end and the lower end thereof and communicates with the lower chain chamber 17 at the lower end. The front wall 21 and the rear wall 22 face each other in an axial direction of the camshaft 9 and the left and right side walls 23 and 24 face each other in a direction perpendicular to the camshaft 9 and the cylinder axis.

As illustrated in FIG. 1, two guide levers 31 and 32 as chain guides are provided to guide the chain 14. Since the configurations of the guide levers 31 and 32 are similar, hereinafter the right guide lever 31 will be mainly described and the difference on the left guide lever 32 will be mainly described.

The guide lever 31 has a lever body 33 made of metal and a sliding rail 34 made of resin. These extend in an arc shape in a generally up-down direction across the upper chain chamber 16 and the lower chain chamber 17. The sliding rail 34 is fixed to the side portion on the chain 14 side of the lever body 33 and causes the chain 14 to slide smoothly when the chain 14 is operated. The sliding rail 34 has a groove-shaped cross section surface which accommodates the outer peripheral side surface portion of the chain 14. The lever body 33 is pivotably supported by a support bolt 41 at an upper end portion located in the upper chain chamber 16. Further, the lever body 33 is pressed toward the chain 14 side by a known chain tensioner 35 at the lower end portion located in the lower chain chamber 17. As a result, the guide lever 31 can pivot about the upper end support portion by the support bolt 41, is pushed toward the chain 14 side at the lower end free end portion, and thus applies a predetermined tension to the chain 14. The chain tensioner 35 is inserted and fixed in the mounting hole of the chain chamber cover 4 which is not illustrated in FIG. 1. An abutment pad 36 is provided at an abutment portion of the lever body 33 with the chain tensioner 35.

Further, a knob portion 37 protruding upward from the upper chain chamber 16 is provided at an upper end portion or a top portion of the lever body 33. The knob portion 37 is a portion to be gripped by an operator and facilitates the insertion work of the guide lever 31 into the upper chain chamber 16 described below.

On the other hand, regarding the left guide lever 32, the same reference numerals are attached to the similar parts in the drawings and the differences will be described below. The left guide lever 32 has a different shape from the right guide lever 31 as illustrated. Further, the left guide lever 32 is not pivotable but is fixed at a certain position by the upper and lower support bolts 41. However, the configurations of the support portions are the same. The knob portion 37 is not provided in the left guide lever 32.

Next, referring to FIG. 3, the support portion of the guide lever 31 by the support bolt 41 will be described. Here, the right guide lever 31 will be also mainly described.

The lever body 33 of the guide lever 31 is provided with a support hole 42 through which the support bolt 41 is inserted from the front. The front wall 21 is provided with an insertion hole 43 through which the support bolt 41 is inserted from the front. The rear wall 22 is provided with a female screw hole 44 through which the male screw portion 46 of the support bolt 41 is screwed. The center axes of the insertion hole 43 and the female screw hole 44 are coaxial and parallel to the central axis of the camshaft 9.

The support bolt 41 has a head portion 45 which is formed at the front end portion, a male screw portion 46 which is formed at the rear end portion, and a shaft portion 47 which is formed between the head portion 45 and the male screw portion 46 and pivotably and slidably inserted through the support hole 42 of the guide lever 31.

The head portion 45 has a tool engaging portion 48 on the front side and a washer portion 49 which is located on the rear side and larger in diameter than the tool engaging portion 48. The tool engaging portion 48 of the embodiment has a hexagonal head with which a tool such as a box wrench can engage from the outside. However, the head may have any shape and an insertion hole into which, for example, a hexagon wrench or a driver is inserted may be provided on the front end surface thereof.

The shaft portion 47 is smaller than the outer diameter of the washer portion 49 and has a predetermined outer diameter d (see FIG. 4) so as to be slidably fitted in the support hole 42. Further, the shaft portion 47 has a length L2 (see FIG. 4) slightly larger than that of the support hole 42 so that the guide lever 31 can be pivoted without rattling in the axial direction.

The male screw portion 46 has a smaller diameter than the shaft portion 47 and has a peripheral groove 50 for threading at the front end thereof. The male screw portion 46 has a chamfered portion 51 on the outer peripheral portion of the rear end thereof for facilitating insertion of the male screw portion 46 into the support hole 42 and the female screw hole 44.

In the front end portion of the female screw hole 44 of the rear wall 22, a non-threaded portion 52 without threads is provided. The inner diameter of the non-threaded portion 52 is equal to or slightly larger than the valley diameter of the female screw hole 44. The non-threaded portion 52 allows the male screw portion 46 to be coaxially positioned by causing the male screw portion 46 to be seat prior to tightening the male screw portion 46 to facilitate subsequent tightening. It is also possible not to provide the non-threaded portion 52.

The insertion hole 43 of the front wall 21 is slightly larger than the head portion 45 of the support bolt 41. However, the gap is small and as large as the tool enters between the tool engaging portion 48 and the insertion hole 43 and the two fingertips of the operator holding the tool engaging portion 48 are barely inserted. Therefore, the operator is forced to perform relatively difficult and delicate work during the installation work of the support bolt 41 through such a small insertion hole 43. After installation of the support bolt 41, the insertion hole 43 is closed by a closing member (not illustrated).

Figure 4:
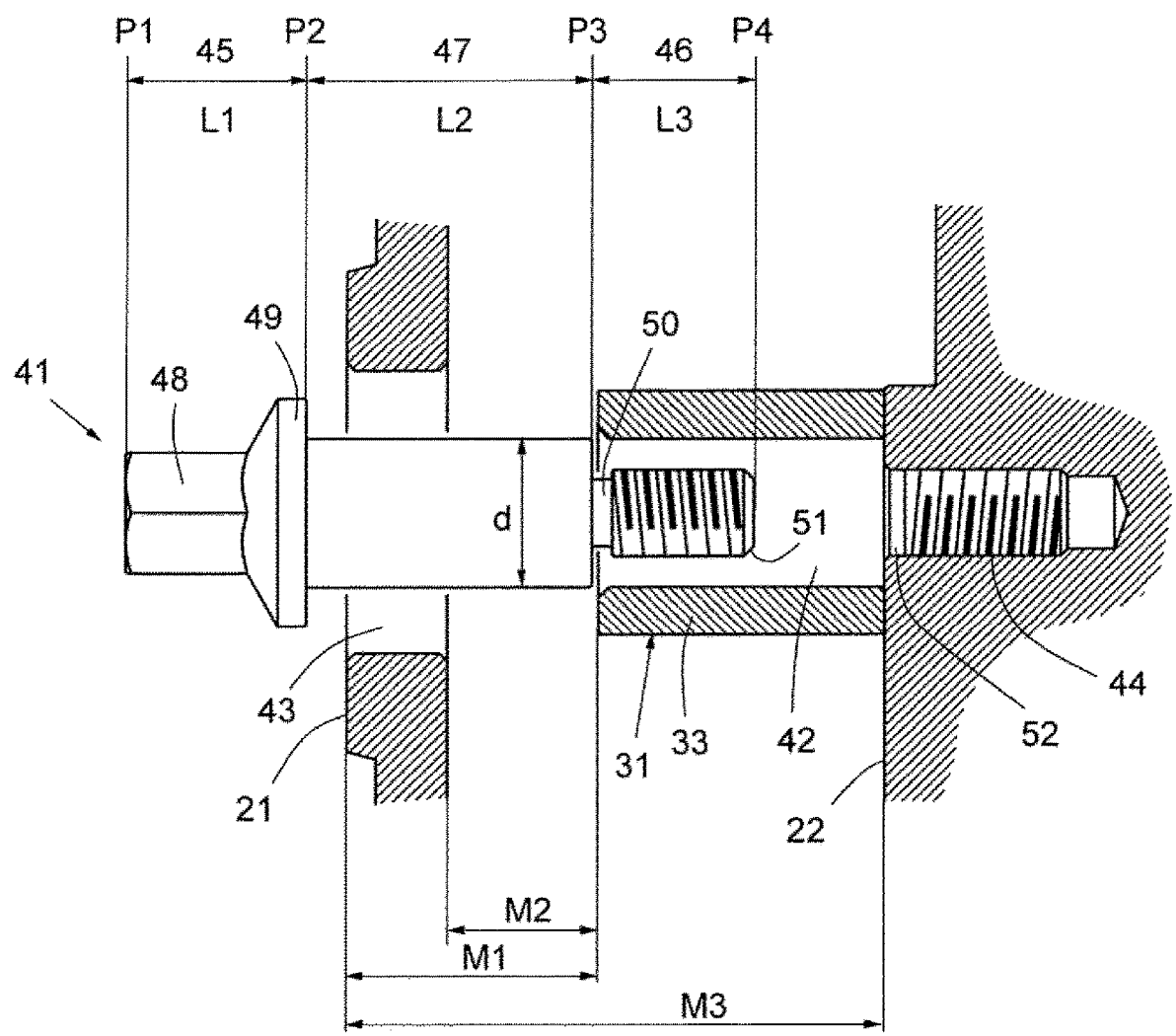
FIG. 4 is a view corresponding to a cross section taken along a line in FIG. 2 which illustrates an installed state of a support bolt.

As illustrated in FIG. 4, the position of the front end of the head portion 45 in the axial direction of the support bolt 41 is indicated by P1, and the position of the rear end of the head portion 45 is indicated by P2. The position of the rear end of the head portion 45 is the same as the position of the front end of the shaft portion 47. The position of the rear end of the shaft portion 47 is indicated by P3. This is the same as the position of the front end of the male screw portion 46. The position of the rear end of the male screw portion 46 is indicated by P4. The length of the head portion 45 is indicated by L1, the length of the shaft portion 47 is indicated by L2, and the length of the male screw portion 46 is indicated by L3.

In a state where the lever body 33 of the guide lever 31 is abut on the rear wall 22, as illustrated in the drawing, a distance from the front end of the support hole 42 to the front end of the insertion hole 43 in a camshaft direction is set to M1 and a distance from the front end of the support hole 42 to the rear end of the insertion hole 43 is set to M2. (M1-M2) means the length of the insertion hole 43 or the thickness of the front wall 21. Further, a distance from the front end of the female screw hole 44 to the front end of the insertion hole 43 is set to M3.

In particular, in the embodiment, the length L2 from the rear end P3 to the front end P2 of the shaft portion 47 is longer than the distance M1. The length L2 from the rear end P3 to the front end P2 of the shaft portion 47 is longer than the distance M2. Further, the length from the rear end P4 of the male screw portion 46 to the front end P1 of the head portion 45, that is, the total length (L1+L2+L3) of the support bolt 41 is longer than the distance M3.

The upper and lower bolt support portions of the left guide lever 32 are configured in the same manner. However, in the lower bolt support portion, the insertion hole 43 does not exist, and thus the support bolt 41 is not inserted through the insertion hole 43.

Next, a method of assembling the camshaft drive device of the embodiment will be described. Such assembling work is performed according to the following steps.

Step 1: In a state where the chain chamber cover 4 is removed, chain 14 is wound around the idle sprocket 8 and the lower end portion of the left guide lever 32 is installed by support bolt 41. In this state, the left guide lever 32 can pivot about the bolt support portion.

Step 2: The chain chamber cover 4 is attached to the cylinder block 3. In this case, the upper end portion of the left guide lever 32 protrudes upward from the upper end opening of the lower chain chamber 17. When the chain chamber cover 4 is attached, the support bolt 41 which attaches the lower end portion of left guide lever 32 is covered with the chain chamber cover 4 and accommodated in the lower chain chamber 17, and thus the support bolt 41 disappears from the outside.

Step 3: The cylinder head 2 to which the camshafts 9 and 10 and the like are attached beforehand is mounted on the cylinder block 3. In this case, the upper end portion of the chain 14 is held in advance at a predetermined position in the upper chain chamber 16 by a jig.

Step 4: The upper end portion of chain 14 is pulled up with a jig and wound around the cam sprocket 13. Further, the right guide lever 31 is inserted from above into the upper chain chamber 16 and the lower chain chamber 17. In this case, insertion is performed from the upper outside of the upper chain chamber 16 by gripping the knob portion 37, and thus it is possible to facilitate the insertion work and prevent the operator's fingers from entering the upper chain chamber 16.

Step 5: The left and right guide levers 32 and 31 are installed in the cylinder head 2 by the support bolts 41. In this installed state, the left guide lever 32 is supported to be pivotable at two upper and lower positions. However, the guide lever 32 is fixed at two positions, and thus the guide lever 32 cannot pivot and is eventually held in a certain position. On the other hand, the right guide lever 31 is pivotably supported at only one upper position.

In Step 5, the installing methods of the left and right guide levers 32 and 31 are the same. Therefore, the right guide lever 31 will be described in detail below.

First, the operator grips the knob portion 37, fine-adjusts the position of the guide lever 31, and aligns the position of the support hole 42 of the guide lever 31 so as to be substantially coaxial with the insertion hole 43 (and the female screw hole 44). Then, the operator grips the head portion 45 of the support bolt 41 and inserts the support bolt 41 into the insertion hole 43 and subsequently the support hole 42 from the front.

In this case, first, as illustrated in FIG. 4, the male screw portion 46 of the support bolt 41 is inserted into the support hole 42. FIG. 4 illustrates a state where the male screw portion 46 is almost completely inserted into the support hole 42 and the rear end P3 of the shaft portion 47 and the front end of the support hole 42 are in approximately the same axial position. Since the length L2 of the shaft portion 47 of the support bolt 41 is longer than the distance M1, the head portion 45 of the support bolt 41 protrudes to the outside in front of the insertion hole 43. Thus, even when the support bolt 41 is released, it is possible to prevent the support bolt 41 from dropping into the upper chain chamber 16.

That is, when the support bolt 41 is released, the support bolt 41 attempts to drop downward together with the guide lever 31 in a state where the support bolt 41 is caught in the support hole 42. However, the support bolt 41 tilts while the support bolt 41 falls. In the support hole 42, the male screw portion 46 obliquely engages with the inner surface of the hole, and thus the detachment between the support hole 42 and the male screw portion 46 are prevented. In the outside in front of the insertion hole 43, the head portion 45 (washer portion 49) is caught around the hole to prevent the head portion 45 from being drawn into the insertion hole 43. Accordingly, the support bolt 41 holds the guide lever 31 in a state where the support bolt 41 is engaged with the insertion hole 43 and the support hole 42. As a result, it is possible to prevent the support bolt 41 from dropping into the upper chain chamber 16, eventually in the lower chain chamber 17, and thus the workability is improved. When the support bolt 41 is dropped, the chain chamber cover 4 must be removed in order to take out the support bolt 41. However, in this embodiment, such a detachment work of the chain chamber cover 4 can also be omitted.

Next, when the insertion of the support bolt 41 is advanced, the shaft portion 47 of the support bolt 41 is inserted into the support hole 42 as illustrated in FIG. 3.

FIG. 3 illustrates a state just before the male screw portion 46 is inserted into the female screw hole 44. Since the length L2 of the shaft portion 47 of the support bolt 41 is longer than the distance M2, even when the support bolt 41 is released, it is possible to prevent the support bolt 41 from dropping into the upper chain chamber 16.

That is, in this case, the support bolt 41 is in a state where the shaft portion 47 is inserted into the support hole 42 and the head portion 45 is inserted in the insertion hole 43. When the support bolt 41 is released, the support bolt 41 attempts to drop downward together with the guide lever 31. However, in this case, since the head portion 45 is caught on the inner surface of the hole of the insertion hole 43, falling is prevented. Thereby, it is possible to prevent the support bolt 41 from dropping into the upper chain chamber 16, eventually in the lower chain chamber 17, and thus the workability is improved.

Next, when the insertion the support bolt 41 is further advanced, the rear end of the male screw portion 46 of the support bolt 41 is inserted into the non-threaded portion 52 at the front end of the female screw hole 44. Therefore, the support bolt 41 is positioned coaxially to the female screw hole 44. In this case, since the length of the non-threaded portion 52 is minute and the total length (L 1+L2+L3) of the support bolt 41 is longer than the distance M3, the tool engaging portion 48 of the support bolt 41 protrudes to the outside in front of the insertion hole 43, and thus it is possible to facilitate the installation work of the support bolt 41 which is performed by gripping the tool engaging portion 48.

Next the operator grips the tool engaging portion 48 of the support bolt 41 and rotates the support bolt 41 one to two in the tightening direction while the operator pushes the support bolt 41. Therefore, the support bolt 41 can be initially screwed manually and the workability can be improved.

Thereafter, a tool such as a box wrench is engaged with the tool engaging portion 48, and the support bolt 41 is sufficiently tightened to the female screw hole 44 by the tool. As a result, the installation work of the support bolt 41 and the guide lever 31 is completed. Finally, the insertion hole 43 is closed with a closing member.

The state after installation of the support bolt 41 is completed is illustrated by the left guide lever 32. In a case of the left guide lever 32, since the guide lever 32 is already pivotably supported at a lower point, it is easier to install the support bolt 41 as compared with the guide lever 31. It is because the position of the support hole 42 can be coaxially aligned with the insertion hole 43 and the female screw hole 44 by pivoting the left guide lever 32. In a state after the support bolt 41 is installed, the head portion 45 is accommodated in the insertion hole 43 and the front end of the head portion 45 is positioned behind the front end of the insertion hole 43.

As described above, according to the embodiment, even when the support bolt 41 is released at the time of installing the support bolt 41, the support bolt 41 can be prevented from dropping into the upper chain chamber 16, and thus the workability can be greatly improved.

Hereinbefore, the embodiments of the disclosure have been described in detail. However, other embodiments are also possible for the disclosure.

The embodiments of the disclosure are not limited to only the embodiments described above and any modifications, applications, and equivalents included in the idea of the disclosure defined by the claims are included in the disclosure. Accordingly, the disclosure should not be construed as limiting, but it can be applied to any other technology belonging within the scope of the idea of the disclosure.

This application is based on Japanese patent application (JP2015-222133) filed on Nov. 12, 2015, the contents of which are incorporated herein by reference.

INDUSTRIAL APPLICABILITY

According to the camshaft drive device of the disclosure, the installation work of a support bolt can be facilitated.

REFERENCE SIGNS LIST

2: cylinder head
9: camshaft
13: cam sprocket
14: chain
16: upper chain chamber
21: front wall
22: rear wall
31, 32: guide lever
37: knob portion
41: support bolt
42: support hole
43: insertion hole
44: female screw hole
45: head portion
46: male screw portion
47: shaft portion

The invention claimed is:

1. A cam shaft drive device comprising:
a cam sprocket, which is attached to a cam shaft;
a chain, which is wound around the cam sprocket;
a guide lever, which guides the chain and has a support hole;
a chain chamber, which has a cylindrical shape and is provided in a cylinder head to accommodate the chain and the guide lever, the chain chamber being defined by a front wall and a rear wall facing each other in an axial direction;
a support bolt, which pivotably supports the guide lever, the support bolt including a head portion that is formed in a front end portion, a male screw portion that is formed in a rear end portion, and a shaft portion that is formed between the head portion and the male screw portion and is pivotably and slidably inserted through the support hole of the guide lever;
an insertion hole, which is provided in the front wall and through which the support bolt is inserted from a front side; and
a female screw hole, which is provided in the rear wall and into which the male screw portion of the support bolt is screwed,
wherein a length from a rear end to a front end of the shaft portion is longer than an axial distance from a front end of the support hole to a front end of the insertion hole in a state where the guide lever abuts on the rear wall.

2. The cam shaft drive device according to claim 1, wherein
the length from the rear end to the front end of the shaft portion of the support bolt is longer than an axial distance from the front end of the support hole to a rear end of the insertion hole in a state where the guide lever abuts on the rear wall.

3. The cam shaft drive device according to claim 1,
wherein a length from a rear end of the male screw portion to a front end of the head portion of the support bolt is longer than the axial distance from a front end of the female screw portion to the front end of the insertion hole in a state where the guide lever abuts on the rear wall.

4. The cam shaft drive device according to claim 1, wherein the guide lever has a knob portion which protrudes upward from the chain chamber at an upper end portion.

\* \* \* \* \*